United States Patent [19]

Manaka et al.

[11] Patent Number: 5,021,960

[45] Date of Patent: Jun. 4, 1991

[54] COMBUSTION FAULT DETECTION APPARATUS AND CONTROL SYSTEM FOR INTERNAL COMBUSTION ENGINE

[75] Inventors: Toshio Manaka, Katsuta; Masami Shida, Mito, both of Japan

[73] Assignee: Hitachi, Ltd., Tokyo, Japan

[21] Appl. No.: 389,736

[22] Filed: Aug. 4, 1989

[30] Foreign Application Priority Data

Aug. 8, 1988 [JP] Japan .................................. 63-195991

[51] Int. Cl.⁵ ................................................ F01L 1/34
[52] U.S. Cl. ........................... 364/431.01; 364/431.05; 123/436; 123/478
[58] Field of Search ...................... 364/431.01, 431.05, 364/431.07, 431.08; 123/419, 436, 478

[56] References Cited

U.S. PATENT DOCUMENTS 4,562,818 1/1986 Kohama et al. .
4,633,403 12/1986 Asmus ........................ 364/431.05
4,683,856 8/1987 Matsuura et al. .

FOREIGN PATENT DOCUMENTS

61-81532A 4/1986 Japan .

Primary Examiner—Parshotam S. Lall
Assistant Examiner—Tyrone Queen
Attorney, Agent, or Firm—Antonelli, Terry, Stout & Kraus

[57] ABSTRACT

A combustion fault detection apparatus for an internal combustion engine, in which a cylinder signal is generated when the piston in each cylinder of the engine is located at a predetermined position, a time interval between cylinder signal is determined, and time intervals for respective cylinders are compared and computed thereby to detect when a combustion fault, if any, has occurred in a specific cylinder.

13 Claims, 7 Drawing Sheets

COMBUSTION FAULT DETECTION APPARATUS AND CONTROL SYSTEM FOR INTERNAL COMBUSTION ENGINE

BACKGROUND OF THE INVENTION

The present invention relates to an apparatus for detecting an abnormal combustion in an internal combustion engine, and more in particular to a combustion fault detection apparatus for an internal combustion engine for detecting a combustion fault in a specific cylinder.

An apparatus for detecting a fault of combustion such as misfire is disclosed in JP-A-50-8919.

This prior art apparatus, however, fails to take into consideration the detection of an abnormal combustion which may occur only in a specific cylinder.

In the case where the combustion of only a specific cylinder becomes abnormal, the other cylinders continue to operate normally. The driver, not conscious of the abnormality which is not accompanied by any sudden torque change, would continue driving, and therefore the problem has been posed of non-combusted fuel being emitted into the exhaust system from the faulty cylinder.

The object of the present invention is to provide a combustion fault detection apparatus for an internal combustion engine which is capable of detecting abnormal combustion in a specific cylinder.

SUMMARY OF THE INVENTION

According to the present invention, there is provided a combustion fault detection apparatus comprising a sensor for detecting the rotational conditions of the engine, cylinder signal generation means for generating a cylinder signal on the basis of an output of the sensor, inter-cylinder time measuring means for measuring the time interval reaching a predetermined condition between cylinders in operation of the engine on the basis of cylinder signals for the respective cylinders, and decision means for detecting on a fault by comparison and computation of the inter-cylinder time intervals.

The combustion fault detection apparatus according to the present invention is adapted to detect the engine speed from a sensor, generate a cylinder signal for each cylinder at a cylinder signal generator, measure the inter-cylinder time in response to a cylinder signal, and make a computation by comparison thereby to detect abnormal combustion in a specified cylinder.

DESCRIPTION OF THE PREFERRED EMBODIMENT

An embodiment of the present invention will be explained below.

Figure 1:
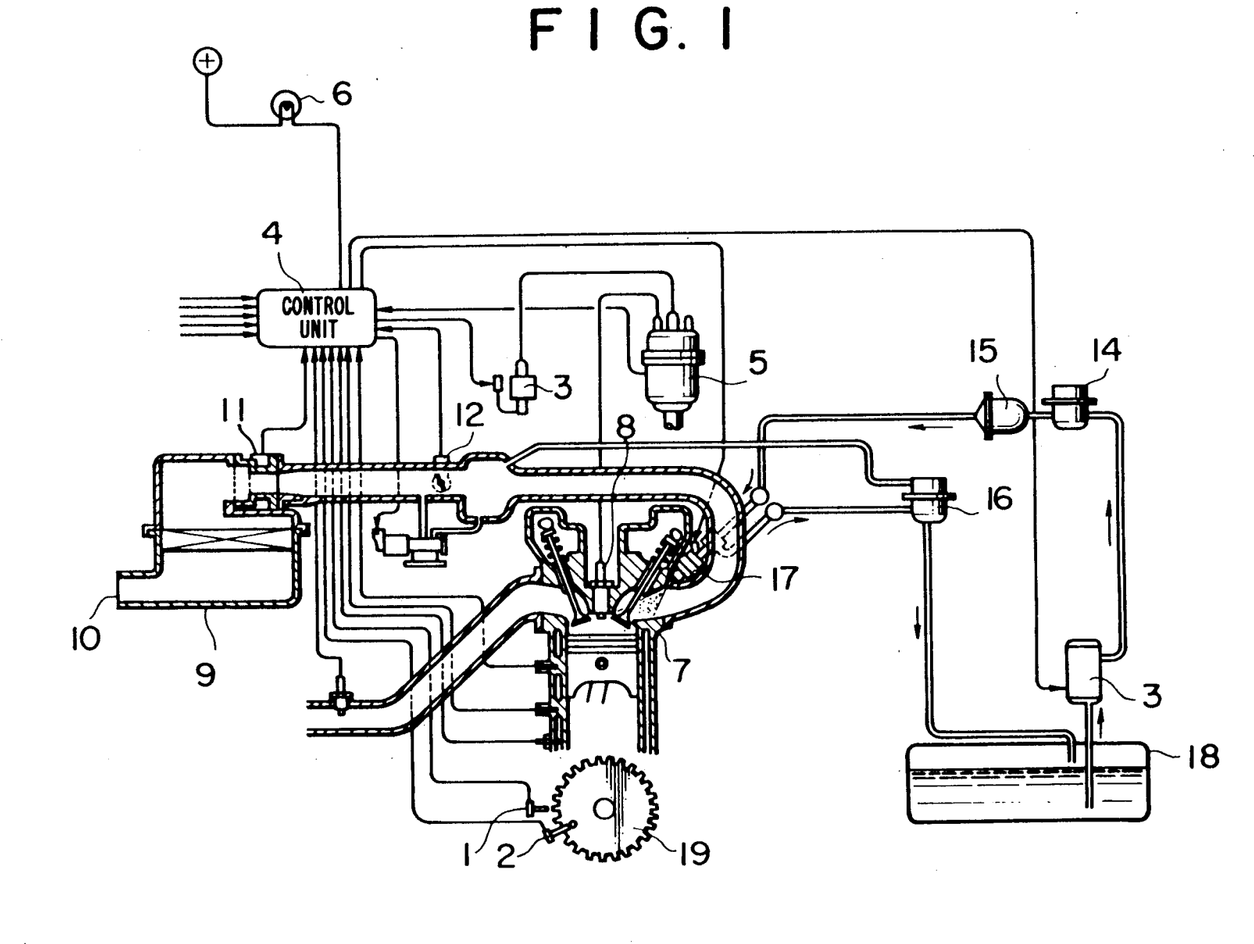
FIG. 1 is a diagram showing an engine control system.

An engine control system embodying the present invention is shown in FIG. 1. Air is introduced by way of an inlet 10 of an air cleaner 9 and is supplied through a hot-wire sensor 11 for detecting the intake air amount and a throttle body 12 including a throttle valve for controlling the air intake amount taken into a cylinder of internal combustion engine 7. An output of the hot-wire sensor 11 is applied to a control unit 4. On the other hand, fuel is pumped up and pressurized by a fuel pump 13 from a fuel tank and is supplied through a fuel damper 14 and a fuel filter 15 supplied to the internal combustion engine 7 by way of an injection valve 17. Fuel pressure is regulated by a regulator 16.

The crankshaft has mounted thereon a disc having a plurality of protrusions at predetermined angular intervals. A crank angle sensor 1 and a reference sensor 2 detect at the pick-up thereof a crank angle signal and a reference signal which are applied to the control unit 4. A distributor 5 has built therein a first cylinder sensor, and a first cylinder signal detected by this sensor is applied to the control unit 4. The control unit 4 includes a CPU, a ROM, a RAM and input and output lines thereof. An output of various sensors including the hot-wire sensor 121 are applied to the control unit 4 and subjected to a predetermined computation process. An output signal representing the result of this computation is used to energize the injection valve 17. An output signal representing the result of computation of the control unit 4 is also applied to a power transistor of the ignition coil to control the ignition timing.

Figure 2:
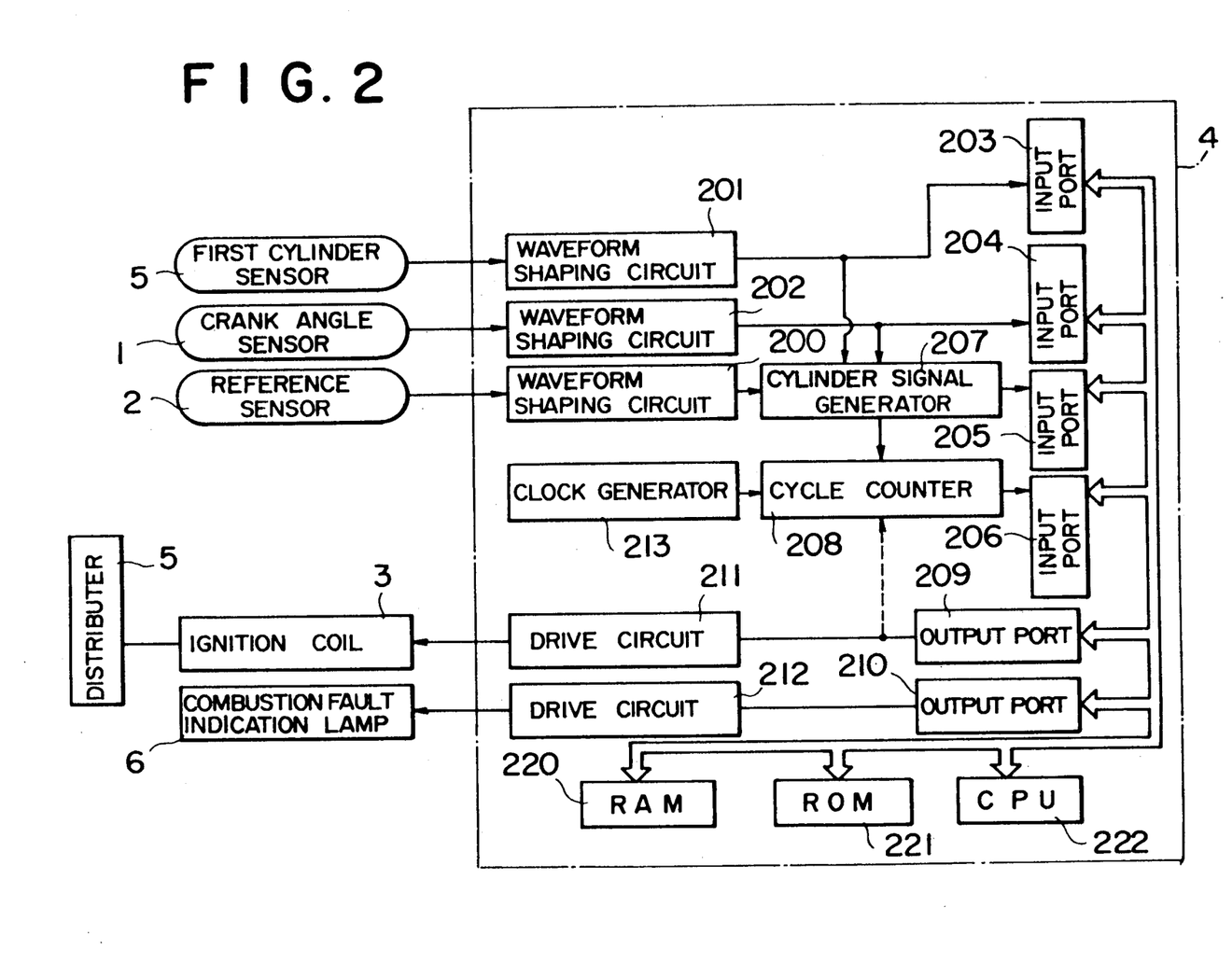
FIG. 2 is a diagram showing a control unit in detail.

FIG. 2 is a diagram showing details of the control unit 4, witch is not fully illustrated for simplification. The first cylinder sensor is provided for detecting a first cylinder signal generated at intervals of two crankshaft revolutions. The first cylinder signal thus detected is shaped into a rectangular waveform by a waveform shaping circuit 201, and further is converted into a digital quantity at an input port 203. The crank angle sensor is for detecting crank angle signals generated at predetermined intervals of crank angle. A crank angle signal thus detected is shaped into a rectangular wave by a waveform shaping circuit 202 and is converted into a digital quantity by an input port 204. A crank angle signal is generated at such comparatively small angular intervals such as one degree of crank angle. The reference sensor is for detecting a reference signal generated at predetermined crank angles. A reference signal thus detected is shaped by a waveform shaping circuit 200. A reference signal is generated at comparatively large angular intervals such as about 180 degree of crank angle. Output signals of the waveform shaping circuits 200, 201 and 202 are applied further to a cylinder signal generator 207, so that a signal is generated for each revolution of the crankshaft corresponding to each cylinder. This signal is converted into a digital quantity by an input port 205. A clock generator 213 generates a rectangular wave in short cycles of time. A cycle counter 208 counts an output of the clock generator 213 and is reset by a cylinder signal of the cylinder signal generator 207, and thus this counter 208 measures the time interval between a given cylinder signal after generation of the preceeding cylinder signal. An output of the cycle counter 208 is converted into a digital quantity by an input port 206. The input ports 203, 204, 205, 206, RAM 220, ROM 221 and CPU 222 are connected by bus lines. The CPU 222 fetches a signal from each input port and processes it by computation in accordance with a program stored in the ROM 221. The RAM 220 is used for temporarily storing the data related to the computation performed by the CPU 222. The CPU 222, ROM 221, RAM 220 and output ports 209, 210 are also connected by the bus lines. The result of computation at the CPU 222 is supplied through an output port 209 by a drive circuit 211, which operates to drive a power transistor of the ignition coil 3, thereby effecting ignition within a cylinder indicated by the distributor 5. Further, a combustion fault indication lamp 6 is energized by a drive circuit 212 through the output port 210.

Figure 3:
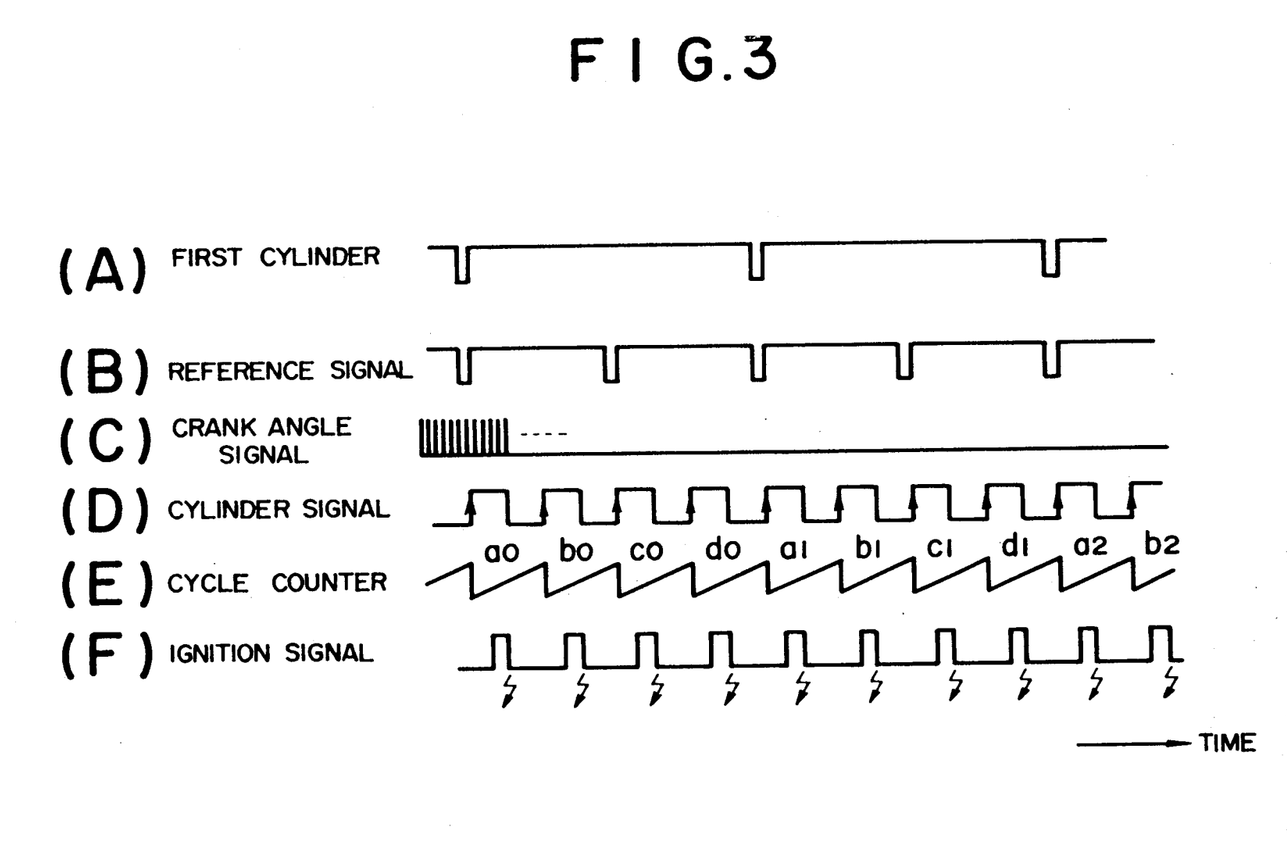
FIGS. 3(A) to 3(F) are timing charts.

FIG. 3 shows a timing chart of the first cylinder signal, reference signal, crank angle signal, cylinder signals, cycle counter signal and an ignition signal. As seen from this timing chart, the first cylinder signal is generated for every two revolutions of the crankshaft, the crank angle signal at each comparatively small angle such as one degree, and the reference signal at each comparatively large crank angle such as 180 degree. Also, the cylinder signal is generated for a number of revolutions of the crankshaft corresponding to each cylinder. FIG. 3(E) shows the operation of the cycle counter for measuring the time length from generation of one cylinder signal to generation of the next cylinder signal.

Figure 5:
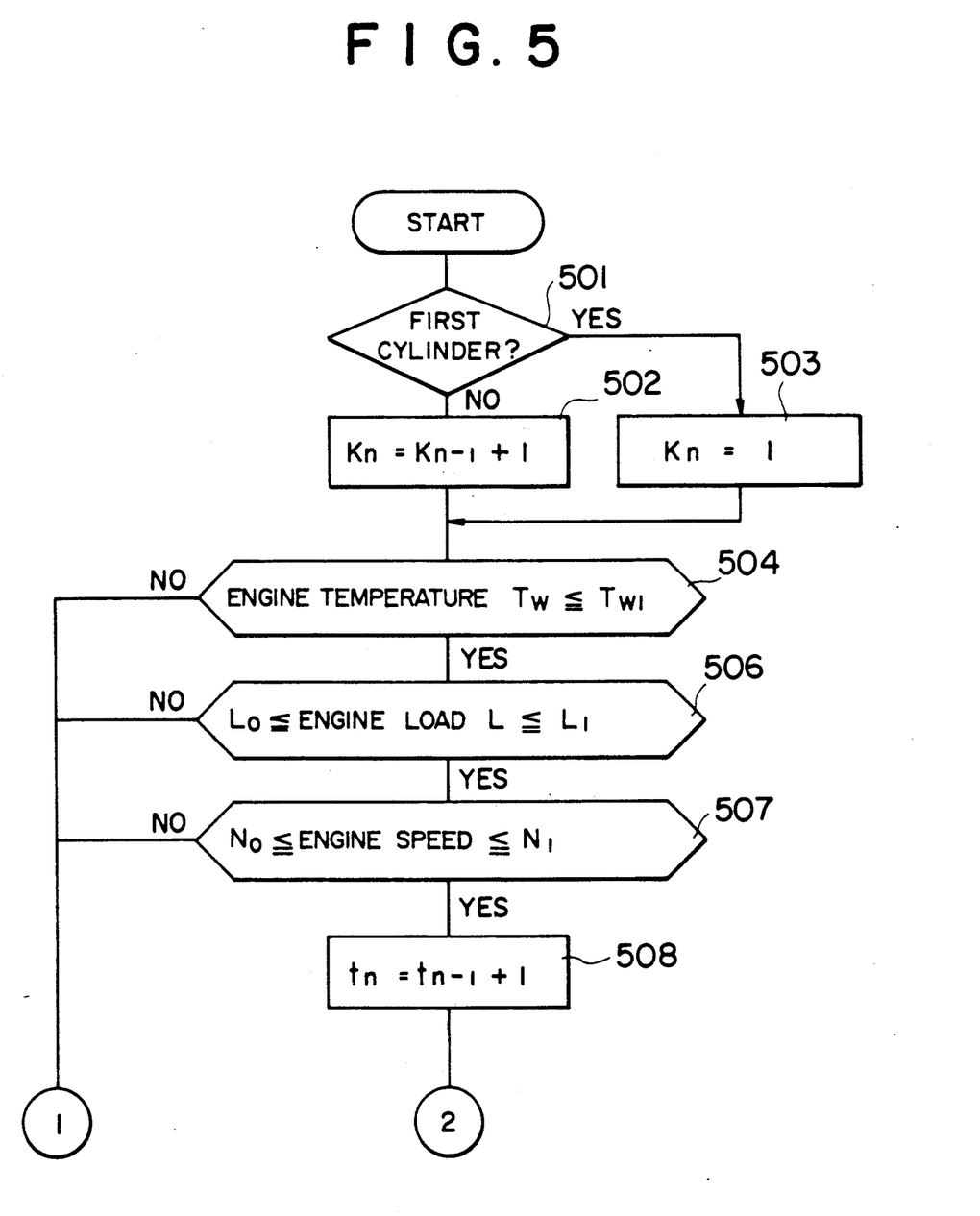
FIGS. 5 to 7 are flowcharts for operation of an apparatus embodying the present invention.

The operation shown in the flowchart of FIG. 5 is initiated for each time of generation of a cylinder signal. First, step 501 decides whether the first cylinder is involved or not. If the first cylinder is involved, step 503 sets a variable $K_n$ indicating a cylinder to "1", and the process proceeds to step 504. If the cylinder involved is not the first one, on the other hand, "1" is added to the preceeding variable $K_{n-1}$ in order to increment the variable $K_n$ indicating a given cylinder, and the process is passed to step 504.

Steps 504 to 507 are for deciding when conditions are met for decision on a combustion fault. Step 504 decides whether the engine temperature $T_w$ has reached a predetermined level $T_{w1}$ which is used as a criterion of engine warming. This temperature may be set to 70° C., for instance. If the engine temperature has reached the predetermined temperature $T_{w1}$, the process proceeds to step 506. If the engine has not reached the predetermined temperature $T_{w1}$, by contrast, it indicates that the engine revolutions have not yet been stabilized. Thus, no decision is made on a combustion fault, and the process is passed to step 707 to be discussed later.

Step 506 decides whether the engine load L falls within a predetermined range between $L_0$ and $L_1$, where $L_1$ may be set to a value associated with the opening of the throttle valve, that is, 0 mmHg or smaller, and $L_0$ to a value associated with the deceleration following idling, that is, approximately $-550$ mmHg. As long as the engine load falls within this predetermined range, the process proceeds to step 507. If the engine load is not within the predetermined range, on the other hand, the process is passed to step 707 without making any decision on a combustion fault.

Step 507 decides whether the engine speed N is within a predetermined range between $N_0$ and $N_1$, where $N_0$ may be set, for example, to a value approximate to the starting engine speed of 400 r.p.m. On the other hand, $N_1$ may be set to about 3000 r.p.m. associated with a large rotational inertia. If the engine speed falls within the predetermined range, the process proceeds to step 508, while if the engine speed is not within the predetermined range, no decision is made on a combustion fault, and the process proceeds to step 707. Steps 504 to 507 may use the basic injection amount, the intake manifold pressure, the throttle valve opening degree or other factors representing the engine load in addition for decision on conditions, to which the fuel injection status indicating whether fuel is cut or not, for example, may be added. Step 508 adds one variable $t_n$ indicating an integration.

Figure 6:
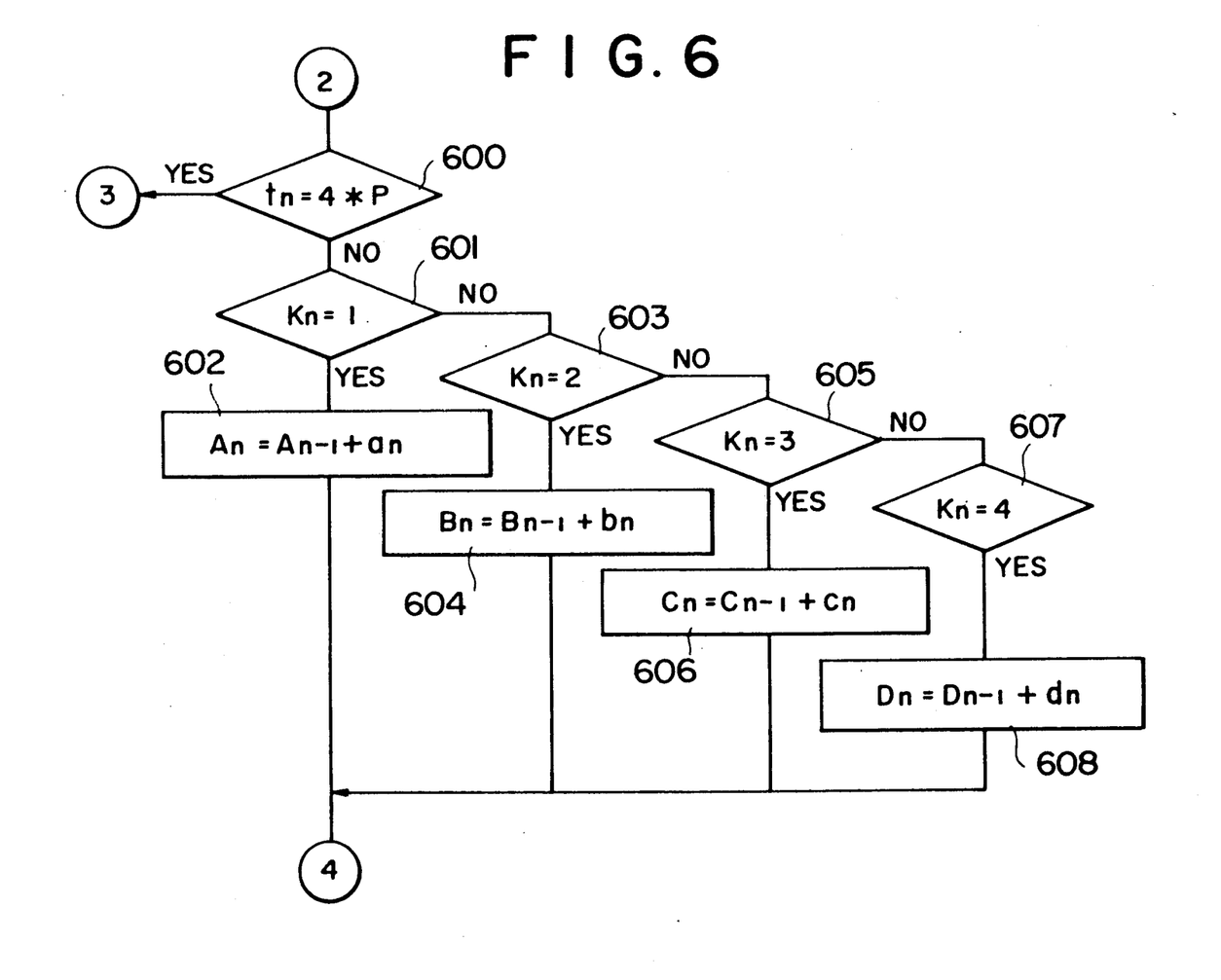

Each of the steps shown in the flowchart of FIG. 6 is for integrating the time representing each inter-cylinder time interval.

Step 600 decides whether the number $t_n$ of integrations has reached $4 \times p$, where p is a number predetermined depending on the form of a fault decision. The formula $4 \times p$ specifies an equal number of integrations for each cylinder of a four-cylinder engine, and may be replaced with $6 \times p$ for a six-cylinder engine to make a similar decision.

If the number of integrations has yet to reach a predetermined number, the process proceeds from step 600 to step 601. Step 601 decides which cylinder the variable $K_n$ indicates. If $K_n$ is "1", that is, if the first cylinder is involved, the process is passed to step 602 Step 602 adds the interval time $a_n$ of the first cylinder to the integrated value $A_{n-1}$ of the first cylinder up to the immediately preceding occasion thereby to provide an integrated value $A_n$ of the first cylinder for the present occasion. The character $a_n$ designates the time required from generation of a signal of the fourth cylinder to the generation of that of the first cylinder by the cylinder signal generator 207, as measured by the cycle counter 208, which time is shown specifically in the timing chart of FIG. 3. The whole process ends after the integration step of 602. If step 601 decides that $K_n$ is not "1", the process proceeds to step 603, which determines whether the variable $K_n$ indicates a specific cylinder "2", that is, whether the second cylinder is involved or not. If the second cylinder is involved, the interval time $b_n$ of the second cylinder up to the immediately preceding occasion is added to the integrated value $B_{n-1}$ thereby to make up an integrated value $B_n$ of the second cylinder for the present occasion. The character $b_n$ designates the time required from generation of a signal of the first cylinder to generation of a signal of the second cylinder by the cylinder signal generator 207, as measured by the cycle counter 208. In similar fashion, steps 605 to 608 decide whether the third or fourth cylinder is involved thereby to compute an integrated value $C_n$ of the third cylinder or $D_n$ of the fourth cylinder respectively.

The interval time of each cylinder may be replaced by the interval of ignition timings, which may be integrated to detect a combustion fault. If step 600 finds that the number of integrations has reached a predetermined level, the process is passed to step 701.

Figure 7:
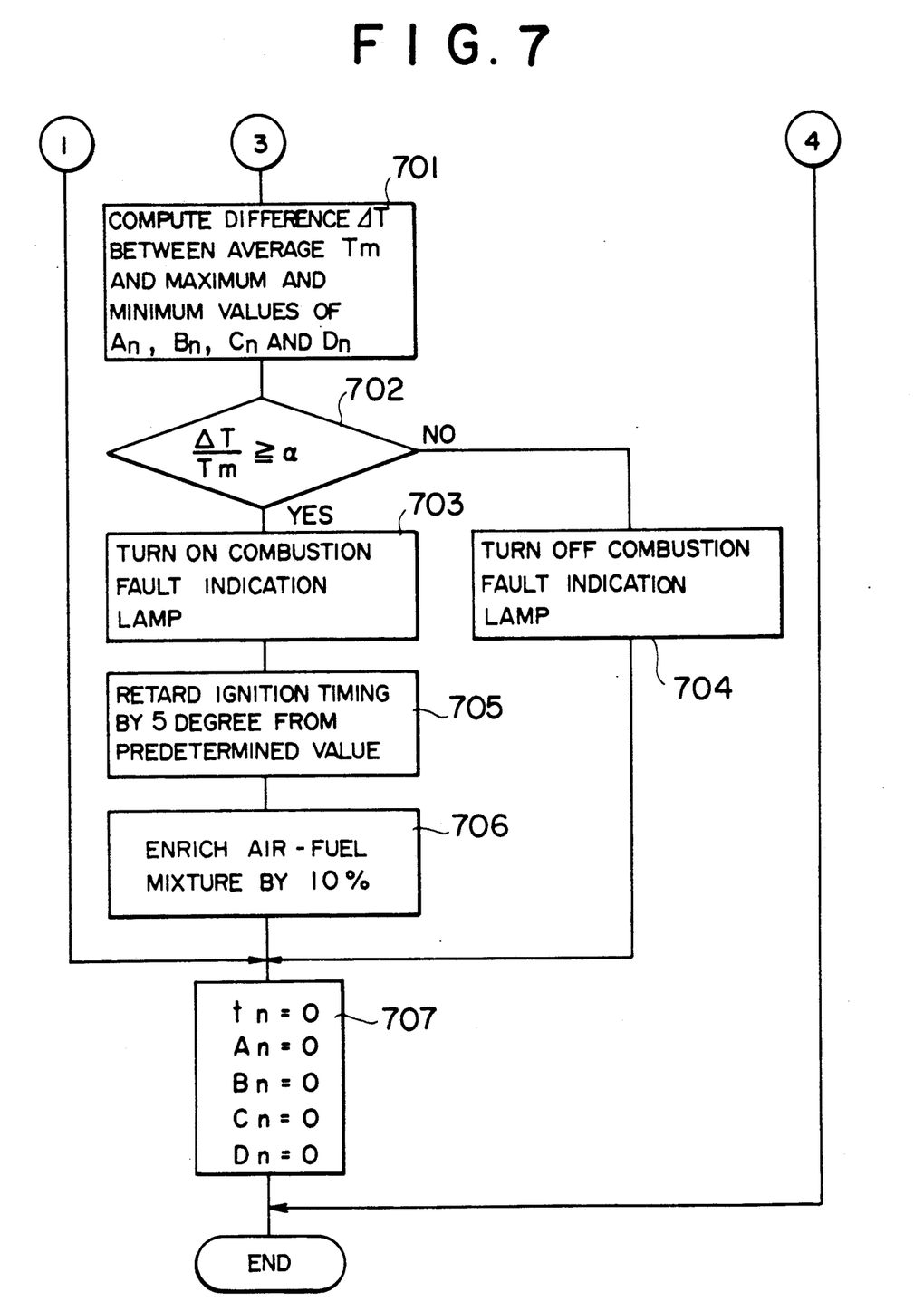

The flowchart of FIG. 7 includes steps for detecting a combustion fault and related processes using an integrated value of the interval time of each cylinder.

Figure 4:
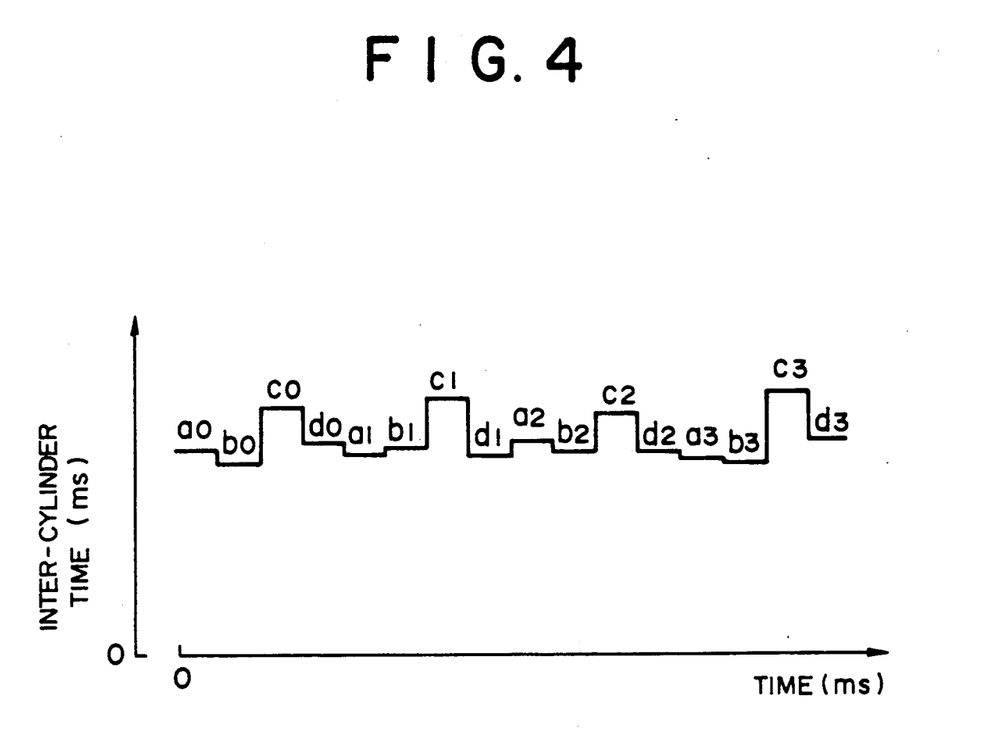
FIG. 4 is a diagram showing time length between the cylinders reaching a predetermined condition in operation.

Step 701 computes an average value $T_n$ of the integrated values $A_n$, $B_n$, $C_n$ and $D_n$ of the cylinders and a difference $\Delta T$ of the maximum and minimum values thereof. FIG. 4 is a diagram showing a cylinder interval time in the case where the third cylinder is faulty and misfires, for example. The cylinder interval time is known to vary depending on the combustion status, the mounting position of the injector or the construction of the air intake system. In the case of a fault such as misfire only for a specific single cylinder, there is generated no torque in the particular cylinder, resulting in an abnormally long interval time thereof. In FIG. 4, it is seen that the figure $C_n$ for the third cylinder is longer than those for the other cylinders. Step 702 decides whether the difference $\Delta T$ divided by the average value tn falls within a predetermined value $\alpha$. In the case of FIG. 4, $$T_n = (A_n + B_n + C_n + D_n)$$
$$A_n = a_0 + a_1 + a_2 + \ldots$$
$$B_n = b_0 + b_1 + b_2 + \ldots$$
$$C_n = c_0 + c_1 + c_2 + \ldots$$
$$D_n = d_0 + d_1 + d_2 + \ldots$$
$$\Delta T = C_n - B_n$$

The value $\Delta T$ or the maximum value less $T_n$ may be used for decision. If step 702 decides that a predetermined range is not satisfied, a faulty condition exists, and therefore a combustion fault lamp is turned on at step 703. Step 705 then controls the ignition timing by retarding it by 5 degree from a predetermined value based on a basic ignition timing dependent on the engine speed and the engine load Step 706 enriches the air-fuel mixture by increasing the air-fuel ratio by 10%.

If step 702 decides that a predetermined range is satisfied, a faulty condition is not involved, and therefore step 704 turns off the combustion fault indication lamp, followed by step 707 for clearing the variables to end the whole process.

This flowchart, which is used for a four-cylinder engine, may be applied also to a six-cylinder engine by adding $E_n$ and $F_n$ to $A_n$, $B_n$, $C_n$ and $D_n$ as variables for integration. The same flowchart may find applications in an engine with an increased number of cylinders by taking a similar procedure.

According to the present invention, a combustion fault of a specific cylinder is thus detected effectively.

We claim:

1. A combustion fault detection apparatus for an internal combustion engine having a plurality of cylinders in which pistons are mounted for reciprocation, comprising a sensor for detecting engine rotational conditions; cylinder signal generation means for generating a respective cylinder signal when the piston in each cylinder is located at a predetermined position as indicated by an output of said sensor; inter-cylinder time determining means for determining the time intervals between cylinder signals generated by said cylinder signal generation means; and decision means for detecting a combustion fault including integration means for determining an integration time for each cylinder by integrating the time intervals for respective cylinders, and means for detecting a combustion fault using said integration times for respective cylinders.

2. A combustion fault detection apparatus according to claim 1, wherein said decision means further includes averaging means for determining an average of the integration times for all cylinders, and said detection means detects a combustion fault by comparing a selected integration time and the average integration time determination by said averaging means.

3. A combustion fault detection apparatus according to claim 1, wherein said decision means further includes maximum integration time-determining means for determining a maximum integration time and minimum integration time-determining means for determining a minimum integration time, and said detecting means detects a combustion fault on the basis of at least one of the maximum integration time and minimum integration time.

4. A combustion fault detection apparatus for an internal combustion engine according to claim 1, further comprising engine temperature detection means for detecting engine temperature, and said detection means operates to detect a combustion fault only when the engine temperature is higher than a predetermined value.

5. A combustion fault detection apparatus for an internal combustion engine according to claim 4, wherein the predetermined engine temperature is approximately 70° C.

6. A combustion fault detection apparatus for an internal combustion engine according to claim 1, further comprising means for detecting engine speed, wherein said detection means operates to a combustion fault only when the engine speed is higher than a predetermined value.

7. A combustion fault detection apparatus for an internal combustion engine according to claim 6, wherein said predetermined value is approximately 400r.p.m.

8. A combustion fault detection apparatus for an internal combustion engine according to claim 1, further comprising means for detecting engine speed, wherein said detection means operates to detect a combustion fault only when said engine speed is lower than a predetermined value.

9. A combustion fault detection apparatus for an internal combustion engine according to claim 8, wherein said predetermined value is approximately 3000 r.p.m.

10. A combustion fault detection apparatus for an internal combustion engine according to claim 1, further comprising means for detecting engine load, wherein said detection means operates to detect a combustion fault only when the engine load is larger than a predetermined value.

11. A combustion fault detection apparatus for an internal combustion engine according to claim 1, further comprising means for detecting engine load, wherein said detection means operates to detect a combustion fault only when the engine load is smaller than a predetermined value.

12. A control system for an internal combustion engine, comprising a combustion fault detection apparatus described in claim 1 and air-fuel ratio control means for controlling the air-fuel ratio to a target value, said air-fuel ratio control means controlling the air-fuel ratio to a side richer than the target air-fuel ratio when a combustion fault is detected.

13. A control system for an internal combustion engine, comprising a combustion fault detection apparatus described in claim 1 and ignition timing control means for controlling the ignition timing according to engine conditions, wherein said ignition timing control means retards the ignition timing by a predetermined angle when a combustion fault is detected.

* * * * *